US008257040B2

(12) United States Patent  
Chen et al.

(10) Patent No.: US 8,257,040 B2
(45) Date of Patent: Sep. 4, 2012

(54) SYSTEM AND METHOD FOR WIND CONDITION ESTIMATION

(75) Inventors: Weiguo Chen, Shanghai (CN); Jiyang Xia, Shanghai (CN); Lei Zhao, Shanghai (CN)

(73) Assignee: General Electric Company, Schenectady, NY (US)

( * ) Notice: Subject to any disclaimer, the term of this patent is extended or adjusted under 35 U.S.C. 154(b) by 554 days.

(21) Appl. No.: 12/566,080

(22) Filed: Sep. 24, 2009

(65) Prior Publication Data

US 2010/0080703 A1 Apr. 1, 2010

(30) Foreign Application Priority Data

Sep. 28, 2008 (CN) .......................... 2008 1 0168792

(51) Int. Cl.
*F03D 11/00* (2006.01)
(52) U.S. Cl. .............. 416/1; 416/35; 416/40; 416/41; 416/61; 415/1; 415/16; 290/44; 290/55
(58) Field of Classification Search ............... 415/1, 16; 416/1, 35, 40, 41, 61; 290/44, 55
See application file for complete search history.

(56) References Cited

U.S. PATENT DOCUMENTS

| 4,155,252 | A | * | 5/1979 | Morrill | ....................... 73/170.08 |
| 4,357,542 | A | * | 11/1982 | Kirschbaum | ................... 290/44 |
| 6,993,965 | B2 | | 2/2006 | Yoshida | |
| 7,363,808 | B2 | | 4/2008 | Ormel | |
| 7,523,001 | B2 | * | 4/2009 | Morjaria et al. | ................... 702/3 |
| 2006/0140764 | A1 | * | 6/2006 | Smith et al. | .................... 416/103 |
| 2007/0125165 | A1 | * | 6/2007 | Ormel et al. | ............... 73/170.01 |
| 2009/0183576 | A1 | * | 7/2009 | Honhoff et al. | ............. 73/861.85 |

FOREIGN PATENT DOCUMENTS

| EP | 1361445 A1 | 11/2003 |
| WO | 0107752 A1 | 10/2001 |

OTHER PUBLICATIONS

Montero, G. et al. 1998 "A 3-D Diagnostic Model for Wind Field Adjustment" Journal of Wind Engineering and Industrial Aerodynamics. vol. 74-76. 249-261.
Ross, D.G., Smith, I.N., Manins, P.C., Fox D.G., 1988, "Diagnostic Wind Field Modeling for Complex Terrain: Model Development and Testing. Journal of Applied Meleorology". vol. 27. 758-796.
T.W. Verbruggen, "Wind Turbine Operation & Maintenance based on Condition Monitoring", ECN-C-047, Apr. 2003.
"Measuring The Wind To Optimize for Wind Energy", ScienceDaily, http://www.sciencedaily.com/releases/2008/03/080306221723.htm.

* cited by examiner

*Primary Examiner* — Igor Kershteyn
(74) *Attorney, Agent, or Firm* — Global Patent Operation; Douglas D. Zhang

(57) ABSTRACT

A wind power generation system includes a wind turbine at a wind turbine location, a measuring device for providing a wind condition signal at a test location, a sensor for providing a wind condition signal at the wind turbine, and a controller. The controller is configured for receiving the wind condition signals, using a wind correlation database and the wind condition signal at the test location for providing a wind condition estimation at the wind turbine location, obtaining a difference between the wind condition signal at the wind turbine location and the wind condition estimate at the wind turbine location, and using the difference for adjusting the wind condition signal at the wind turbine location.

24 Claims, 6 Drawing Sheets

— 122

| $D_i$(DEGREE) | DATA SET $M_i$ |
|---|---|
| M1 | 0 |
| M2 | 30 |
| M3 | 60 |
| M4 | 90 |
| M5 | 120 |
| M6 | 150 |
| M7 | 180 |
| M8 | 210 |
| M9 | 240 |
| M10 | 270 |
| M11 | 300 |
| M12 | 330 |

FIG. 4

| $S_j$ (m/s) \ $D_i$ (degree) | 0 | 30 | 60 | 90 | 120 | 150 | 180 | 210 | 240 | 270 | 300 | 330 |
|---|---|---|---|---|---|---|---|---|---|---|---|---|
| 5 | A0 | A1 | A2 | A3 | ...... | | | | | | | A11 |
| 6 | | | | | | | | | | | | |
| 7 | | | | | | | | | | | | |
| 8 | | | | | | | ⋮ | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | ...... | | | | | | | | | | | A119 |

SYSTEM AND METHOD FOR WIND CONDITION ESTIMATION

BACKGROUND

The invention relates to systems and methods for estimating wind conditions for wind turbines.

Recently, wind turbines have received increased attention as environmentally safe and relatively inexpensive alternative energy sources. With this growing interest, considerable efforts have been made to develop wind turbines that are reliable and efficient. Generally, a wind turbine includes a rotor having multiple blades. The rotor is mounted to a housing or nacelle, which is positioned on top of a truss or tubular tower. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid. To maximize the efficacy of power generation and to simplify connection to the utility grid, wind turbines are often located in proximity to one another, which are generally referred to in the pertinent arts as a "wind farm."

Accurate estimation of wind conditions such as wind speeds and directions is desired to improve wind farm reliability and performance. One method of wind condition estimation for a wind farm is to equip each wind turbine with a measurement system and a control system to enable each wind turbine to independently react to changing wind conditions. However, the effectiveness of these control systems is constrained by limitations on sensor technologies.

Another technique for wind estimation involves the use of a separate meteorological mast ("metmast"). The metmast includes a separate tower associated with measurement sensors. The metmast provides a more accurate measurements of wind conditions at its location, and then a controller extrapolates to provide estimates for individual wind turbines. The accuracy of this technique is constrained by the methodologies used, especially if the wind farm has a complex terrain.

It would be desirable to have an improved method and apparatus for measurement of wind conditions for a wind farm.

BRIEF DESCRIPTION

In accordance with an embodiment disclosed herein, a wind power generation system is provided. The wind power generation system includes a wind turbine at a wind turbine location, a measuring device for providing a wind condition signal at a test location, a sensor for providing a wind condition signal at the wind turbine, and a controller. The controller is configured for receiving the wind condition signals, using a wind correlation database and the wind condition signal at the test location for providing a wind condition estimation at the wind turbine location, obtaining a difference between the wind condition signal at the wind turbine location and the wind condition estimate at the wind turbine location, and using the difference for adjusting the wind condition signal at the wind turbine location.

In accordance with another embodiment disclosed herein, a method includes receiving a wind condition signal at a wind turbine location; receiving a wind condition signal at a test location; using a wind correlation database and the wind condition signal at the test location for providing a wind condition estimation at the wind turbine location; obtaining a difference between the wind condition signal at the wind turbine location and the wind condition estimation at the wind turbine location; and using the difference for adjusting the wind condition signal at the wind turbine location.

In accordance with still another embodiment disclosed herein, a method includes receiving wind condition signals at a wind turbine location and a metmast location, mapping a wind field of a field of interest according to the wind condition signal at the wind turbine location and a terrain parameter of the field of interest, using the wind field to obtain a wind condition estimation at the metmast location, obtaining a difference of the wind condition signal at the metmast location and the wind condition estimation at the metmast location, and using the difference for adjusting the wind condition signal at the wind turbine location.

DRAWINGS

These and other features, aspects, and advantages of the present invention will become better understood when the following detailed description is read with reference to the accompanying drawings in which like characters represent like parts throughout the drawings, wherein:

FIG. 4 is a wind velocity correlation database according to one embodiment of the invention.

FIG. 5 is a wind velocity correlation database according to another embodiment of the invention.

DETAILED DESCRIPTION

Figure 1:
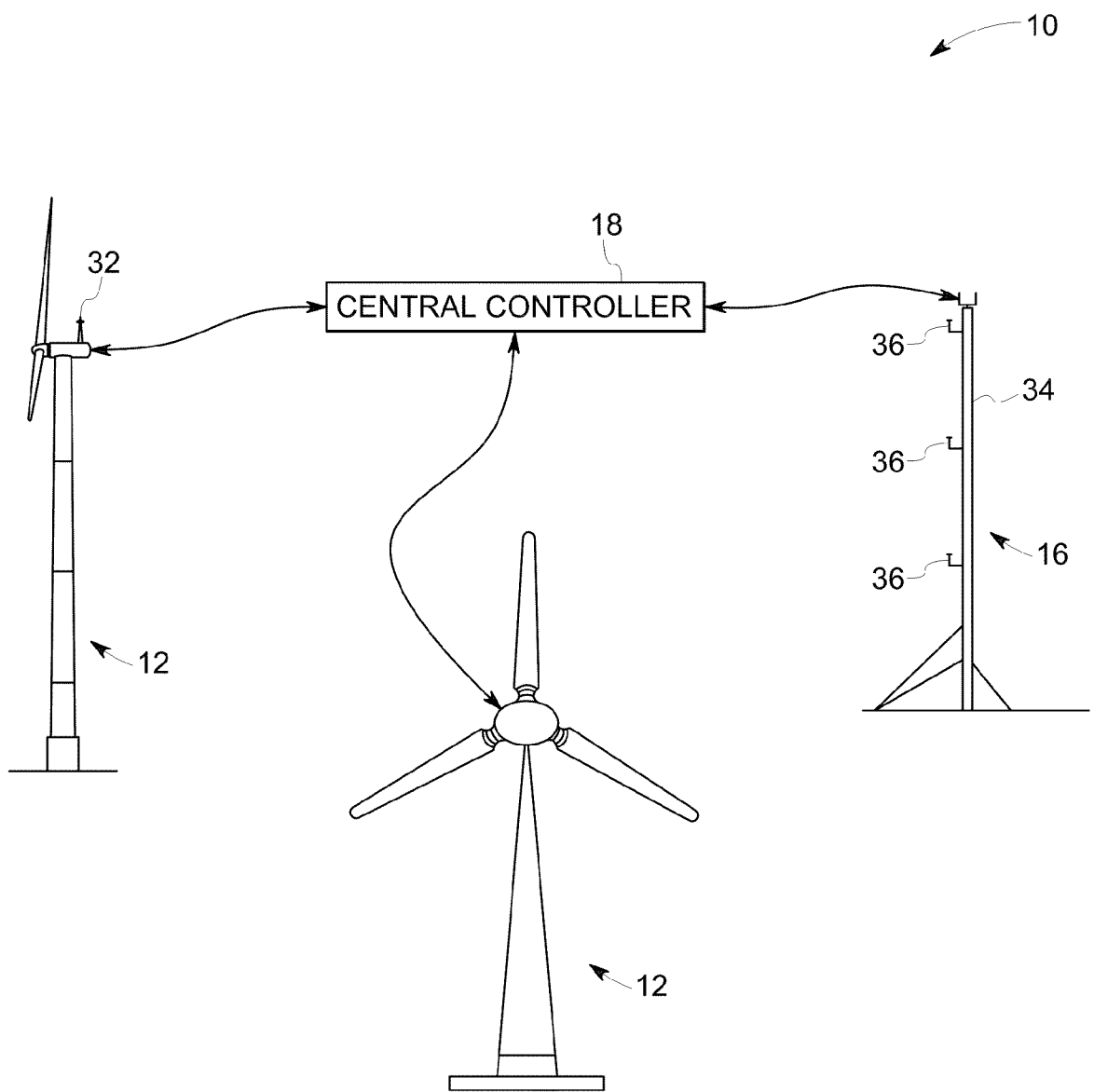
FIG. 1 illustrates a wind farm configuration.

FIG. 1 illustrates an exemplary wind power generation system such as a wind farm 10, which includes two wind turbines 12 operable to supply electrical power to a utility (not shown) such as a power grid. Although two wind turbines 12 are shown in FIG. 1, it should be understood that wind farms can include any number of wind turbines, including only one wind turbine, or multiple wind turbines, that may be similar or different in design and/or power delivery. Wind farm 10 additionally comprises a measuring apparatus for providing a relatively accurate wind condition signal at a test location. The measuring apparatus may comprise, for example, a meteorology station nearby wind farm 10, or a Doppler SODAR in wind farm 10, or a meteorology mast ("metmast"). As with the wind turbines, more than one measuring apparatus may be used if desired. In one exemplary embodiment, the measuring apparatus comprises a metmast 16 at a metmast location in wind farm 10. Wind farm 10 further includes a central controller 18 for communicating with each wind turbine 12 and metmast 16. Central controller 18 may be used for functions such as overall system monitoring and control including, for example, pitch and speed regulation, high-speed shaft and yaw brake application, yaw and pump motor application, fault monitoring, and combinations thereof. Distributed and/or centralized control architectures may be used in some embodiments. Wind turbine 12 and metmast 16 are described in more detail below. As used herein, singular forms such as "a," "an," and "the" include plural referents unless the context clearly dictates otherwise.

Figure 2:
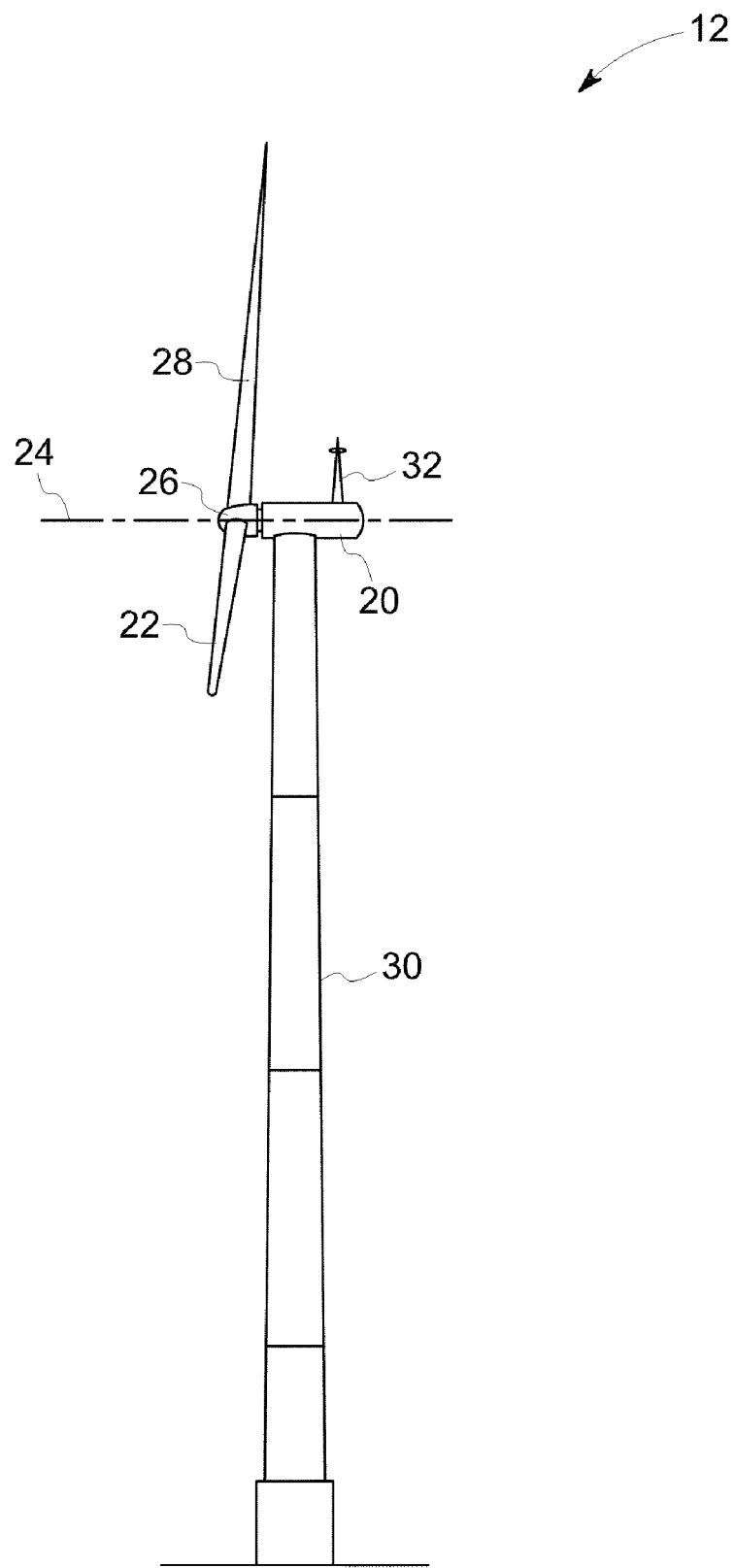
FIG. 2 illustrates a wind turbine in the wind farm of FIG. 1 according to certain embodiments of the invention.

FIG. 2 is a perspective view of wind turbine 12 in accordance with certain embodiments of the invention. The illustrative wind turbine 12 includes a body 20, also referred to as a "nacelle", and a rotor 22 coupled to nacelle 20 for rotation with respect to body 20 about an axis of rotation 24. Rotor 22 includes a hub 26 and a plurality of blades 28 (sometimes referred to as "airfoils") extending radially and outwardly from hub 26. In operation, wind impinges on blades 28 and causes the blades 28 to rotate. Mechanical energy generated by rotation of the blades 28 is converted by a system within the nacelle 20 to produce electrical energy.

In the exemplary embodiment, nacelle 20 is mounted on a tower 30. The height of tower 30 may be any suitable height enabling wind turbine 12 to function as described herein. Although rotor 22 is described and illustrated herein as having three blades 28, rotor 22 may have any number of blades 28.

Referring again to FIG. 1, wind turbines 12 each include one or more sensors 32 for real-time measurement of wind conditions at their respective locations. In certain embodiments, the wind condition can be wind direction, or wind speed, or a wind velocity including both wind direction and wind speed information. In one embodiment, measuring sensors 32 are mounted on nacelles 20 of wind turbines 12. In alternative embodiments, wind turbines 12 include one or more sensors coupled to a wind turbine hub, rotor blade, tower, or shaft. In one embodiment, wind speeds and wind directions are respectively measured by different sensors 32. Sensors 32 for measuring wind speeds may comprise anemometers, for example, and sensors 32 for measuring wind directions may comprise anemoscopes and/or windvanes, for example.

As further illustrated in FIG. 1, metmast 16 includes a tower 34 and a plurality of sensors 36. In one embodiment, sensors 36 are mounted on different levels of tower 34 for measurement of wind velocities at different heights. Metmast 36 may or may not have its base at a common elevation level as the wind turbines, and may or may not have a similar height as the wind turbines. When a different elevation level and/or height is present, additional extrapolation may be used by the central controller 18.

Figure 3:
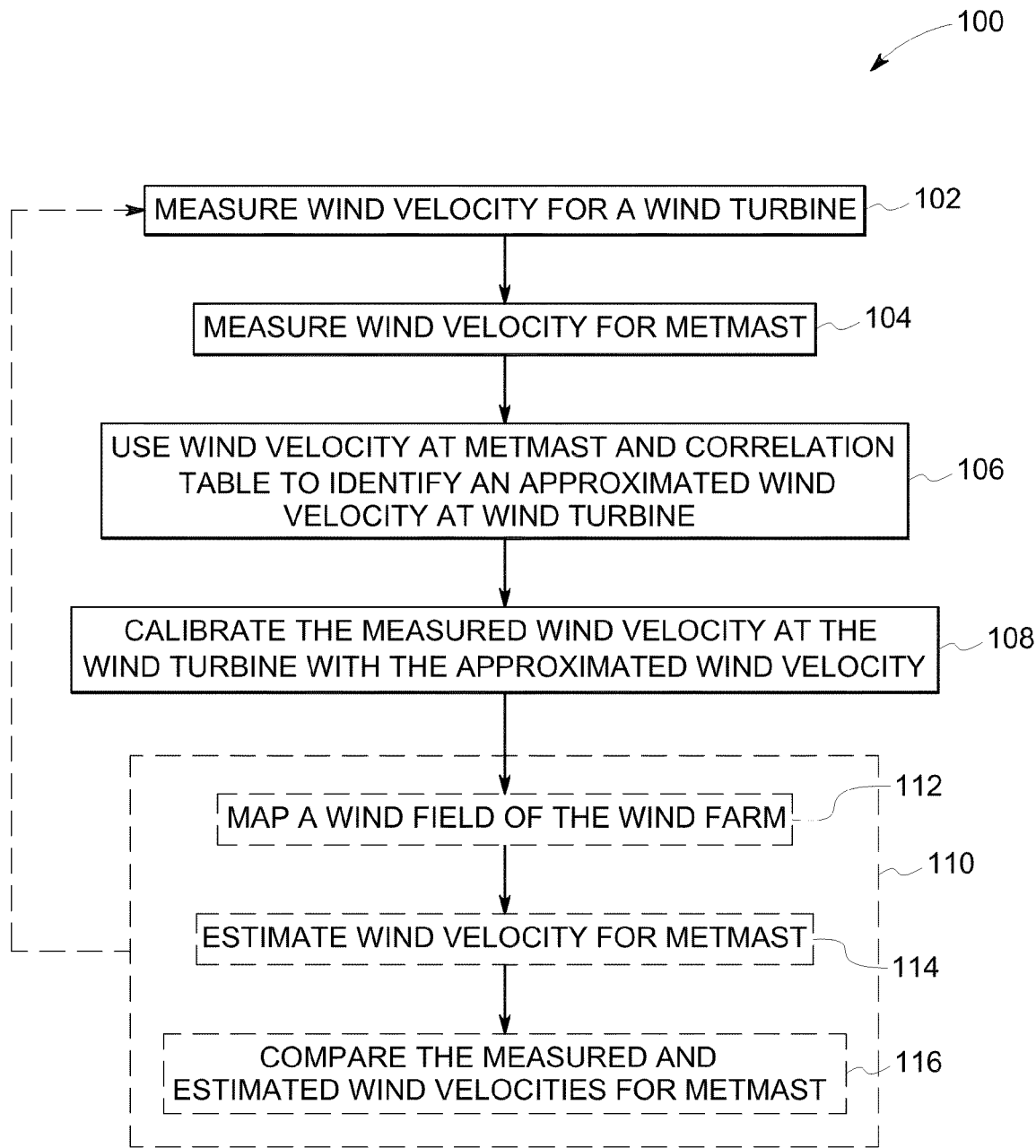
FIG. 3 is a flow map of wind condition measurement according to one embodiment of the invention.

FIG. 3 is a flow chart illustrating a method 100 of wind condition measurement according to one embodiment of the invention. At step 102, at least one sensor 32 measures a turbine wind condition at wind turbine 12 and sends a turbine wind condition signal to central controller 18. In one embodiment, the wind condition signal is a turbine wind velocity $\vec{V}_{tm}$. The wind velocity $\vec{V}_{tm}$ includes a turbine wind speed component $S_{tm}$ and a turbine wind direction component $D_{tm}$. At step 104, at least one sensor 36 on metmast 16 measures an actual metmast wind velocity $\vec{V}_{mm}$. The actual metmast wind velocity $\vec{V}_{mm}$ includes an actual metmast wind speed component $S_{mm}$ and an actual metmast wind direction component $D_{mm}$.

At step 106, central controller 18 searches in a wind correlation database for an approximate wind velocity of metmast 16 which is most close to the measured actual metmast velocity $\vec{V}_{mm}$. An exemplary wind correlation database 122 according to a first embodiment is shown in FIG. 4. The correlation database 122 is formulated by simulating the wind blowing to wind farm 10 from a number n of wind directions D with a certain wind speed. The illustrated correlation database 122 includes twelve wind directions D, i.e. n=12, and thus every two adjacent directions are separated by 30 degrees. One example of a certain wind speed is 10 meter per second ("m/s"). At each direction $D_i$ with a wind speed of 10 m/s that blows to the wind farm 10, there is a corresponding wind correlation set $M_i$. Each wind correlation set $M_i$ includes a corresponding wind velocities $\vec{V}_{mi}$, and $\vec{V}_{ti}$ respectively for metmast 16 and wind turbine 12. Each of the wind velocities $\vec{V}_{mi}$ and $\vec{V}_{ti}$ includes a wind direction component $D_i$ and a wind speed component $S_i$. For a wind farm 10 with a plurality of wind turbines 12, each wind correlation set $M_i$ includes a wind velocity $\vec{V}_{mi}$ of metmast 16 and wind velocities $\vec{V}_{ti}$ for each wind turbine 12. In certain embodiments, wind correlation database 122 can be established before the measuring process 100. Wind correlation 122 can be simulated by commercially available software, such as supplied by ANSYS, Inc. and WindSim AS.

Referring to FIGS. 3 and 4, at step 106, database 122 is searched for an approximated wind correlation set $M_p$ which has a wind direction component $D_{mp}$ for metmast 16 is most close to measured actual wind direction component $D_{mm}$. Then the corresponding approximated wind velocity $\vec{V}_{tp}$ in the same wind correlation set $M_p$ for wind turbine 12 is identified.

Still referring to FIG. 3, at step 108, measured wind velocity $\vec{V}_t$ for wind turbine 12 is adjusted. In one embodiment, an updated wind velocity $\vec{V}_{t\_new}$ for wind turbine 12 includes an updated wind speed component $S_{t\_new}$ and an updated wind direction component $D_{t\_new}$. In one embodiment, the updated wind direction component $D_{t\_new}$ is approximated using an iterative method, for example, according to Equation 1:

$$D_{t\_new}=D_t+\gamma(D_{tp}-D_t) \qquad \text{Equation 1}$$

wherein $D_{tp}$ is a direction component of approximated wind velocity $\vec{V}_{tp}$; $\gamma$ is a relaxation factor, and $0<\gamma\leq 1$. In one embodiment, $\gamma=0.05$.

An updated wind speed component $S_{t\_new}$ may be calculated according to Equation 2:

$$S_{t\_new} = S_t + \gamma\left(S_{tp} * \frac{S_{mm}}{S_{mp}} - S_t\right) \qquad \text{Equation 2}$$

wherein $S_{mp}$ is a wind speed component of approximated wind velocity $\vec{V}_{mp}$ for metmast 16, $S_{mm}$, is the wind speed component of measured actual wind velocity $\vec{V}_{mm}$, for metmast 16; $S_{tp}$ is a wind speed component of approximated wind velocity $\vec{V}_{tp}$ for metmast; $\gamma$ is a relaxation factor, and $0<\gamma\leq 1$. In one embodiment, $\gamma=0.05$. Whereby, an updated wind velocity $V_{t\_new}$ for wind turbine 12 is obtained.

Since the angle between every two adjacent wind directions in database 122 in FIG. 4 is 30 degrees, a maximum error of the approximation of the wind direction is less than 15 degrees. The error can be decreased by increasing the number of wind directions in the database 122. For example, one may simulate twenty-four wind directions D with a certain wind speed and obtain twenty-four wind velocities for each of metmast 16 and wind turbine 12. In this embodiment, the maximum error for appropriation of wind direction can be reduced to less than 7.5 degrees.

A second embodiment of a wind correlation database 124 for performing step 106 is shown in FIG. 5. The wind correlation database 124 is formulated by simulating a number n of wind directions D and simulating each direction with a number m of wind speeds S, for example twelve wind directions D and ten wind speeds S, from 5 m/s to 14 m/s in each wind direction D, as illustrated. Each data set $A_{ij}$, which corresponds to one simulated wind direction $D_i$ and one wind speed $S_j$, includes a wind velocity $\vec{V}_{mij}$ for metmast 16 and a wind velocity $\vec{V}_{tij}$ for wind turbine 12. In certain embodiments, each data set $A_{ij}$, includes a wind velocity $\vec{V}_{mij}$ for metmast 16 and a plurality of wind velocities $\vec{V}_{mij}$ for a plurality of wind turbines 12. The velocity correlation database 124 can also be simulated by commercially available software, such as CFX® or Fluent® by ANSYS, Inc.

Referring to FIGS. 3 and 5, a second embodiment of step 106 based on the wind correlation database 124 includes a search in the velocity database 124 for a data set $A_{pq}$, in which the wind velocity $\vec{V}_{m\_pq}$ for metmast 16 is most close to the measured actual wind velocity $\vec{V}_{mm}$.

Still referring to FIGS. 3 and 5, a second embodiment of step 108 for adjusting the wind velocity $\vec{V}_{tm}$ may includes calculating an updated wind velocity $\vec{V}_{t\_new}$ by using an iterative method, for example, according to Equation 3:

$$\vec{V}_{t\_new} = \vec{V}_t + \gamma(\vec{V}_{t\_pq} - \vec{V}_t) \quad \text{Equation 3}$$

wherein $\vec{V}_{t\_pq}$ is an approximated wind velocity of wind turbine 12 in the data set $A_{t\_pq}$. "γ" is a relaxation factor, and $0 < \gamma \leq 1$. In one embodiment, γ=0.05. For a wind farm with a plurality of wind turbines, each data set $A_{ij}$ includes wind correlation information for metmast 16 and each wind turbine 12, and an updated wind velocity $\vec{V}_{t\_new}$ for each wind turbine 12 can be obtained by similar method.

Referring back to FIG. 3, after an updated wind velocity $V_{t\_new}$ for wind turbine 12 is obtained, a verifying step 110 may be performed. In one embodiment, verifying step 110 includes sub-steps 112-114. At step 112, central controller 18 uses the updated wind velocity $V_{t\_new}$ for wind turbine 12 and terrain parameters of wind farm 10 to map a wind field for wind farm 10. The wind field for wind farm 10 need not cover the entire wind farm 10 and may optionally be a field of interest which includes wind turbine 12 and metmast 16. The mapping can be performed by known methodologies in meteorological arts. An exemplary method may use a diagnostic model, which can generate a wind field utilizing updated wind velocity $V_{t\_new}$ and terrain parameters for the field of interest and which satisfies flow physics. One embodiment includes formulating an initial wind field using updated wind velocity $V_{t\_new}$ by interpolation and extrapolation, considering distance and height differences between interpolation points of wind farm 10 and wind turbine 12, and then using the initial wind field to map an estimated wind field by solving a mass conservation equation that reflects flow physics. *A 3-D diagnostic model for wind field adjustment. Journal of Wind Engineering and Industrial Aerodynamics.* Vol. 74-76. 249-261. Montero, G. et al. 1998 and *Diagnostic Wind Field Modeling for Complex Terrain: Model Development and Testing. Journal of Applied Meteorology.* vol. 27. 785-796. Ross, D. G., Smith, I. N., Manins, P. C., Fox, D. G., 1988 describe a number of modeling methods, which are incorporated herein by reference for purposes of example. In one embodiment, one updated wind velocity $V_{t\_new}$ for wind turbine 12 is used to generate the wind field. In another embodiment, a plurality of updated wind velocities $V_{t\_new}$ for a plurality of wind turbines 12 in the field of interest are used to establish the wind field.

Terrain parameters of the field may change with one example being growth of plants in or near the field. In some embodiments, the terrain parameters may be modified as conditions change and/or by month, by quarter, by year, or by any acceptable time period.

With continued reference to FIG. 3, at step 114, wind velocity of metmast 16 is estimated as $\vec{V}_{me}$ according to the wind field. The estimated wind velocity $\vec{V}_{me}$ is compared to the measured actual wind velocity $\vec{V}_{mm}$ of metmast 16 at step 116, and a second difference $\Delta\vec{V}$ is obtained, $\Delta\vec{V} = \vec{V}_{mm} - \vec{V}_{me}$. If $\Delta\vec{V}$ is not zero, there is a margin of error for the updated wind velocity $\vec{V}_{t\_new}$ of wind turbine 12. If the difference $\Delta\vec{V}$ is larger than a preset value $\vec{V}_0$, wind velocities $\vec{V}_{t\_new}$ may need to be further adjusted. In one embodiment, the process starts again at step 102 to perform steps 102-108 for further adjustment. In certain embodiments, steps 102-116 may be repeated, until a minimum $\Delta\vec{V}$ is obtained, or until $\Delta\vec{V} \leq \vec{V}_0$.

Figure 6:
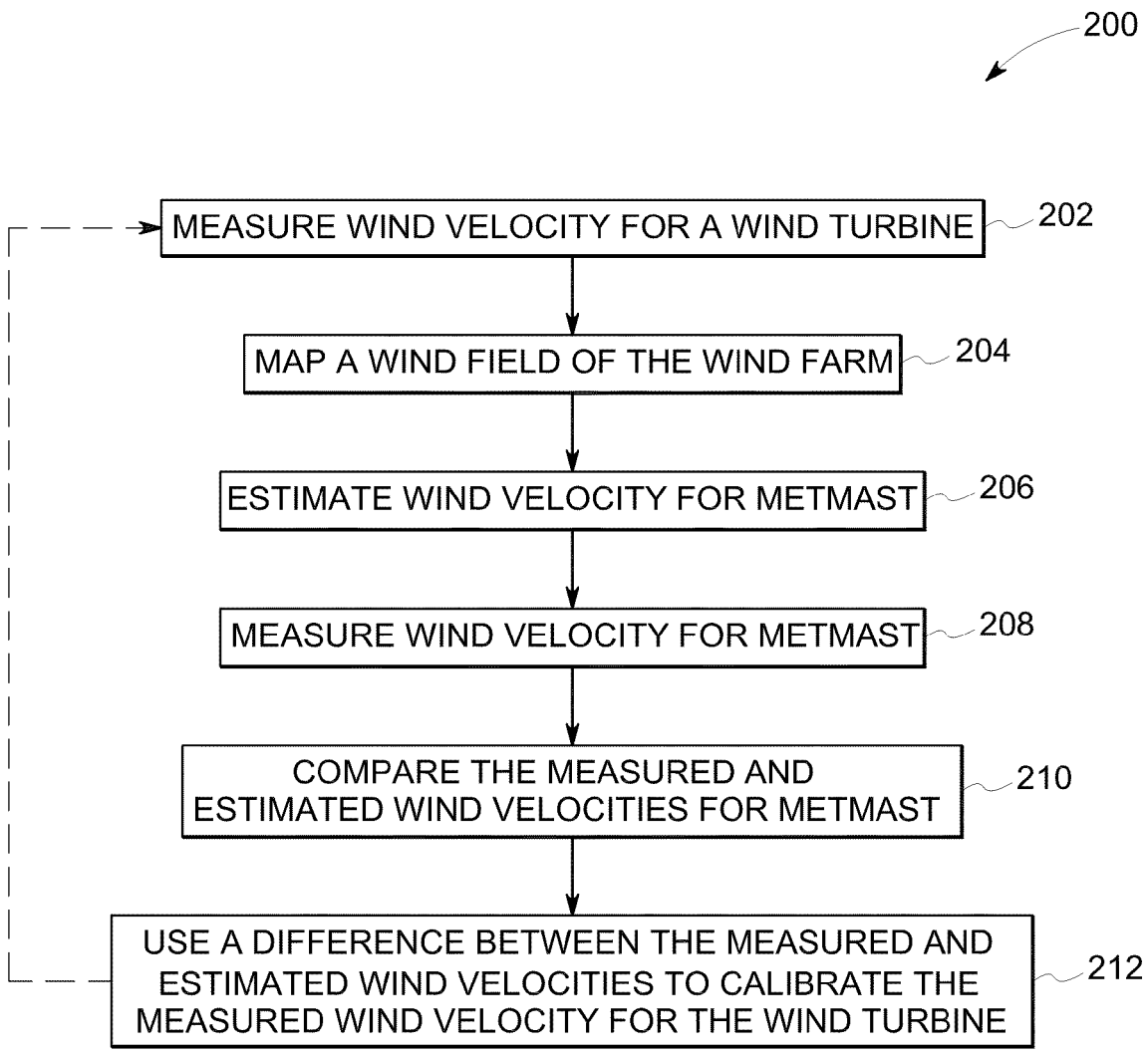
FIG. 6 is a flow map of wind condition measurement according to a second embodiment of the invention.

FIG. 6 is a flow chart illustrating a method 200 of wind condition measurement according to another embodiment of the invention. At step 202, at least one sensor 32 on wind turbine 12 measures a wind condition at wind turbine 12 and sends a wind condition signal to central controller 18. In one embodiment, the wind condition signal is a wind velocity $\vec{V}_{t2}$, which includes a turbine wind speed component $S_{t2}$ and a turbine wind direction component $D_{t2}$.

At step 204, central controller 18 uses wind velocity $\vec{V}_{t2}$ and terrain parameters of the field of interest of wind farm 10 to map a wind field. The wind field can be established by a similar method as described at step 112 of FIG. 3. Wind velocity of metmast 16 is estimated as $\vec{V}_{me2}$ according to the wind field established at step 204, and an actual wind velocity $\vec{V}_{mm2}$ of metmast 16 is measured at step 208 which includes an actual wind speed component $S_{mm2}$ and an actual wind direction component $D_{mm2}$. At step 210, the estimated wind velocity $\vec{V}_{me2}$ is compared with the measured actual wind velocity $\vec{V}_{mm2}$, and a difference $\Delta\vec{V}_2$ is obtained, $\Delta\vec{V}_2 = \vec{V}_{mm2} - \vec{V}_{me2}$. If $\Delta\vec{V}_2$ is not zero, there is a margin of error for the wind field derived from wind velocity $\vec{V}_{t2}$ of wind turbine 12. If the difference $\Delta\vec{V}_2$ is larger than a preset value $\vec{V}_0$, wind velocity $\vec{V}_{t2}$ may be adjusted at step 212. At step 212, wind velocity $\vec{V}_{t2}$ is adjusted by using the difference $\Delta\vec{V}_2$.

In certain embodiments, the difference $\Delta\vec{V}_2$ includes a wind speed difference component $\Delta S_2$ and a wind direction difference component $\Delta D_2$. An updated wind turbine velocity $\vec{V}_{t\_new2}$ of wind turbine 12 includes an updated turbine wind speed component $S_{t\_new2}$, and an updated turbine wind direction component $D_{t\_new2}$. The updated turbine wind speed component $S_{t\_new2}$ may be calculated by equation 4:

$$S_{t\_new2} = S_{tm2} + \gamma \Delta S_2 \quad \text{Equation 4}$$

wherein "γ" is a relaxation factor, and $0 < \gamma \leq 1$. In one embodiment, γ=0.05. The updated turbine wind direction component $D_{t\_new2}$ may be calculated according to equation 5:

$$D_{t\_new2} = D_{tm2} + \gamma \Delta D_2 \quad \text{Equation 5}$$

In certain embodiments, after the wind velocity $\vec{V}_{t2}$ of wind turbine 12 is adjusted, the adjusted wind velocity $\vec{V}_{t\_new2}$ may be verified. In one embodiment, the verifying includes building an updated wind field for the field of interest of wind farm 10 using the updated wind velocity $\vec{V}_{t\_new2}$ for wind turbine 12 by utilizing the method described at step 204. After an updated wind field is established, an updated estimated wind velocity $\vec{V}_{me\_new2}$ of metmast 16 is obtained. The updated estimated wind velocity $\vec{V}_{me\_new2}$ is then compared with the measured wind velocity $\vec{V}_{mm}$ of metmast 16 to obtain an updated difference $\Delta \vec{V}_{new}$. If $\Delta \vec{V}_{new} < \Delta \vec{V}_2$, it is verified that the adjustment of wind velocities $\vec{V}_{t2}$ is in the right direction. Steps 104 to 114 may be repeated until a smallest $\Delta \vec{V}$ is obtained or until $\Delta \vec{V} \leq \vec{V}_0$. If the updated difference $\Delta \vec{V}_{new} > \Delta \vec{V}$, it suggests that the measured wind velocities $\vec{V}_{t2}$ of wind turbine 12 has already best represented the wind condition at wind turbine 12 and need not be adjusted.

In certain embodiments, at least two metmasts 16 are located in wind farm 10. Wind condition signal of wind turbine 12 is adjusted according to the measured signal condition signal of each metmast 16 using method 100, and at least two updated wind condition signals are obtained. The at least two updated wind condition signals are optimized to obtain a final updated wind condition signal at wind turbine 12.

Central controller 18 is configured to communicate with individual wind turbines 12 and metmast 16 via communication links, which may be implemented in hardware, software, or combinations thereof. In certain embodiments, the communication links may be configured to remotely communicate data signals to and from the central controller 18 in accordance with any wired or wireless communication protocol known to one skilled in the art.

In certain embodiments, each wind turbine 12 includes a turbine controller (not shown) which communicates with central controller 18 and utilizes the adjusted wind velocity to perform yaw control and/or speed regulation, so as to achieve a maximum wind energy capture.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A wind power generation system comprising:
   (a) a wind turbine at a wind turbine location;
   (b) a measuring device for providing a wind condition signal at a test location;
   (c) sensors for providing a wind condition signal at the wind turbine; and
   (d) controller for:
      (i) receiving the wind condition signals;
      (ii) using a wind correlation database and the wind condition signal at the test location for providing a wind condition estimation at the wind turbine location;
      (iii) obtaining a difference between the wind condition signal at the wind turbine location and the wind condition estimate at the wind turbine location; and
      (iv) using the difference for adjusting the wind condition signal at the wind turbine location.

2. The system of claim 1, wherein the measuring device comprises a metmast at a metmast location in the wind farm.

3. The system of claim 2 wherein the wind turbine comprises at least first and second wind turbines at first and second wind turbine locations, wherein the sensors comprise sensors for providing wind condition signals at the first and second wind turbine locations and the metmast location.

4. The system of claim 1, wherein the sensors comprise anemometers, windvanes, or combinations thereof.

5. The system of claim 1, wherein the wind correlation database includes a plurality of wind correlation sets, and wherein each set includes wind condition signals for the wind turbine and test locations.

6. The system of claim 5, wherein the controller is configured for providing the wind condition estimation at the wind turbine location by searching in the wind correlation database for an approximate wind correlation set that has a wind condition signal for the test location which is most close to the wind condition signal at the test location, and obtaining the wind condition estimation for the wind turbine location in the approximate wind correlation set.

7. The system of claim 1, wherein the controller is also configured for verifying an updated wind condition signal at the wind turbine location.

8. A method, comprising:
   (i) receiving a wind condition signal at a wind turbine location;
   (ii) receiving a wind condition signal at a test location;
   (ii) using a wind correlation database and the wind condition signal at the test location for providing a wind condition estimation at the wind turbine location;
   (iii) obtaining a difference between the wind condition signal at the wind turbine location and the wind condition estimation at the wind turbine location; and
   (iv) using the difference for adjusting the wind condition signal at the wind turbine location.

9. The method of claim 8 further comprising generating the wind correlation database for the wind turbine location and the test location by defining a field of interest, simulating wind blowing to the field of interest at a plurality of directions, and obtaining a plurality of wind correlation sets each corresponding to one wind direction and including wind condition signals of the wind turbine and test locations.

10. The method of claim 9, wherein simulating wind blowing to the field of interest at a plurality of directions comprises simulating wind blowing to the field of interest at the plurality of directions with a constant wind speed.

11. The method of claim 9, wherein using a wind correlation database and the wind condition signal at the test location for providing a wind condition estimation at the wind turbine location comprises searching in the wind correlation database for an approximate wind correlation set that has a wind condition signal for the test location which is most close to the wind condition signal at the test location, and obtaining the wind condition estimation for the wind turbine location in the approximate wind correlation set.

12. The method of claim 11, wherein the wind condition signal at the wind turbine location comprises a wind direction component, and the wind condition estimation comprises a wind direction estimation, and wherein using a difference for adjusting the wind condition signal at the wind turbine location comprises using a difference of the wind direction component and the wind direction estimation to obtain an updated wind direction signal for the wind turbine location.

13. The method of claim 12, wherein using a difference of the wind direction component and the wind direction estimation to obtain an updated wind direction signal comprises using an iterative method.

14. The method of claim 8 further comprising generating the wind correlation database for the wind turbine location and the test location by defining a field of interest, simulating wind blowing to the field of interest at a plurality of wind directions and a plurality of wind speeds at each direction, and obtaining a plurality wind correlation sets, each wind correlation set corresponding to one wind direction and one wind speed and comprising an estimated wind condition signal for the test location and an estimated wind condition signal for the wind turbine location.

15. The method of claim 14, wherein using a wind correlation database and the wind condition signal at the test location for providing a wind condition estimation at the wind turbine location comprises searching in the wind correlation database for an approximate wind correlation set that has an approximate wind condition signal for the test location which is most close to the wind condition signal at the test location, and obtaining the wind condition estimation for the wind turbine in the approximate wind correlation set.

16. The method of claim 15, wherein the wind condition signal at the wind turbine and the wind condition estimation at the wind turbine are wind velocities, and wherein using a difference for adjusting the wind condition signal at the wind turbine location comprises using a difference of the wind velocities to obtain an updated wind direction signal for the wind turbine location.

17. The method of claim 8 further comprising receiving a wind condition signal from a second wind turbine.

18. The method of claim 8 further comprising mapping a wind field of a field of interest according to the wind condition signal at the wind turbine location and a terrain parameter of the field of interest.

19. The method of claim 18, wherein the mapping of the wind field of a field of interest is performed by building a diagnostic model.

20. The method of claim 19 further comprising using the wind field to estimate a wind condition estimation for the test location.

21. The method of claim 20 further comprising comparing the wind condition signal at the test location with the wind condition estimation at the test location to obtain a second difference, using the second difference to verify if the wind condition signal at the wind turbine needs to be further adjusted.

22. A method comprising:
receiving wind condition signals at a wind turbine location and a test location;
mapping a wind field of a field of interest according to the wind condition signal at the wind turbine location and a terrain parameter of the field of interest;
using the wind field to obtain a wind condition estimation at the test location;
obtaining a difference of the wind condition signal at the test location and the wind condition estimation at the test location; and
using the difference for adjusting the wind condition signal at the wind turbine location.

23. The method of claim 21, wherein the wind turbine comprises at least first and second wind turbines at first and second wind turbine locations, wherein the wind condition signal at the wind turbine location comprises a first wind turbine signal at the first wind turbine location and a second wind condition signal at the second wind turbine location.

24. The method of claim 23, wherein mapping a wind field of a field of interest according to the wind condition signal at the wind turbine location and a terrain parameter of the field of interest comprises using the first and second wind condition signals at the first and second wind turbine locations and the terrain parameter to map the wind field.

* * * * *

UNITED STATES PATENT AND TRADEMARK OFFICE
CERTIFICATE OF CORRECTION

PATENT NO. : 8,257,040 B2
APPLICATION NO. : 12/566080
DATED : September 4, 2012
INVENTOR(S) : Weiguo Chen et al.

It is certified that error appears in the above-identified patent and that said Letters Patent is hereby corrected as shown below:

Title Page, Item (56), under "OTHER PUBLICATIONS", in Column 2, Line 6, delete "Meleorology"." and insert -- Meteorology". --, therefor.

In Column 4, Line 1, delete " $\vec{V}_{mi}$ " and insert -- $\vec{V}_{mi}$ --, therefor.

In Column 4, Line 42, delete "$S_{mm}$," and insert -- $S_{mm}$ --, therefor.

In Column 4, Line 43, delete " $\vec{V}_{mm}$ " and insert -- $\vec{V}_{mm}$ --, therefor.

In Column 8, Line 14, in Claim 3, delete "2" and insert -- 2, --, therefor.

In Column 8, Line 40, in Claim 8, delete "(ii)" and insert -- (iii) --, therefor.

In Column 8, Line 43, in Claim 8, delete "(iii)" and insert -- (iv) --, therefor.

In Column 8, Line 46, in Claim 8, delete "(iv)" and insert -- (v) --, therefor.

Signed and Sealed this
Fifth Day of February, 2013

Teresa Stanek Rea
*Acting Director of the United States Patent and Trademark Office*